March 1, 1932.                    C. P. SHAW                    1,847,729
                                   GASKET
                            Filed Oct. 29, 1928
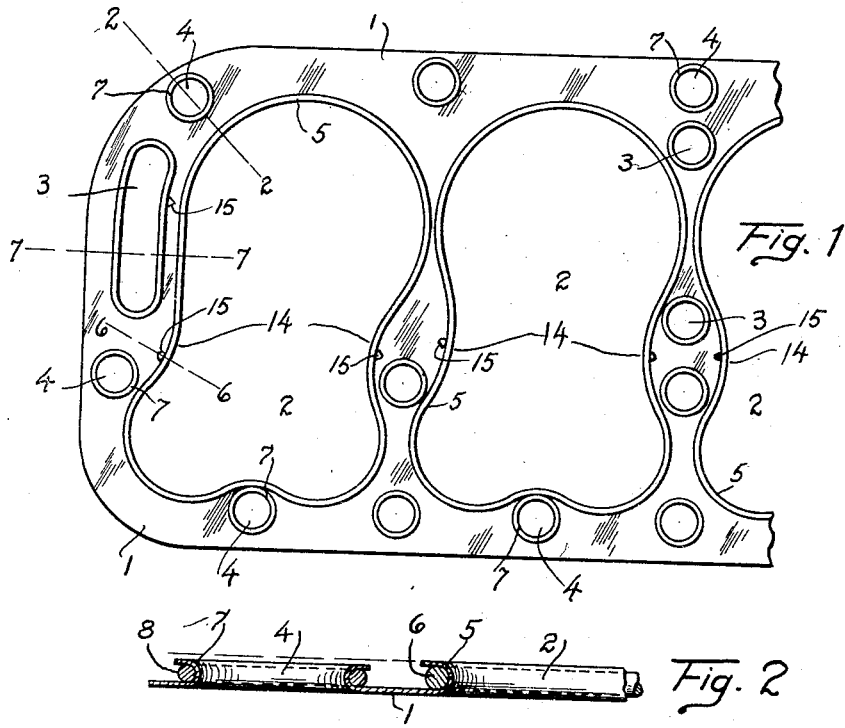
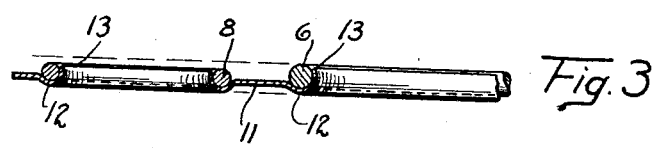
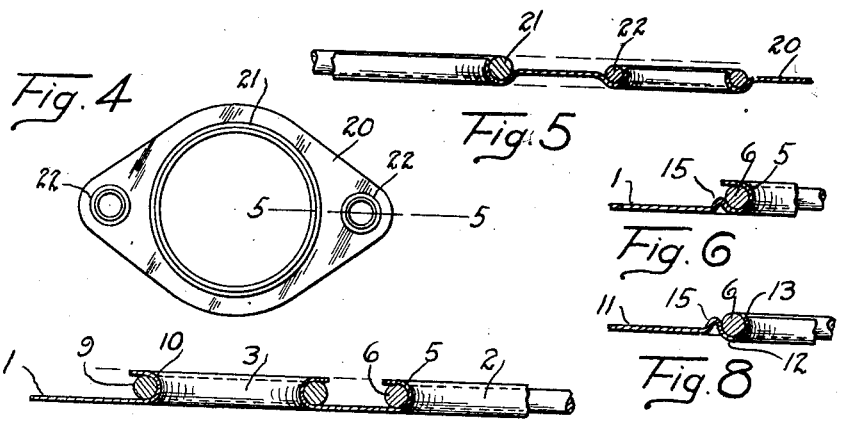
INVENTOR.
Charles P. Shaw
BY
Stuart C. Barnes
ATTORNEY.

Patented Mar. 1, 1932

1,847,729

UNITED STATES PATENT OFFICE

CHARLES P. SHAW, OF DETROIT, MICHIGAN

GASKET

Application filed October 29, 1928. Serial No. 315,680.

This invention relates to gaskets such as are used for effecting a seal between an engine block and cylinder head of an internal combustion engine, or between two adjacent parts of a conduit or the like.

The invention is concerned principally with the provision of a gasket capable of meeting the exacting requirements in the present day automotive art. At the present time internal combustion engines are being made so as to have a very high compression, which is increased over that of engines of a short time back, and difficulty has been experienced in that the gaskets used will not withstand the compression and very often the gaskets blow through.

It is appreciated that there have been quite a number of suggestions or proposals on the different ways of making gaskets. Nevertheless the general practice today for internal combustion engines is the use of a gasket embodying two thin layers of copper with an intermediate layer of asbestos cut to the proper shape and with the edges of the copper sheets turned over at the openings where the seal is to be effected. Thus the thickness of the metal at the sealing point is only that of the thickness of the one or two sheets of copper which are flanged over. The high compression and the intense heat burns through this metal and this is what is known as blowing of the gasket.

The present invention aims to provide a gasket wherein there is an appreciable amount of metal located at the critical point, or, in other words, the point where the seal is to be effected. Sufficient metal is provided to withstand very high pressures, or compression, and the intense heat. Moreover, the invention contemplates a gasket which can be made and supplied to the trade at a cost lower than the cost of the gaskets heretofore supplied, and in this connection it will be noted, as the invention is more fully described, that the amount of waste material which comes about in the making of the gasket is much less than that heretofore encountered.

In the accompanying drawings:

Fig. 1 is a plan view of a section of a gasket designed for use between a cylinder block and cylinder head of an internal combustion engine.

Fig. 2 is an enlarged sectional view on line 2—2 of Fig. 1.

Fig. 3 is a sectional view similar to that shown in Fig. 2 illustrating a somewhat modified arrangement of the parts of the gasket.

Fig. 4 is a plan view of a gasket designed for use between adjoining parts of the conduit, such as the exhaust or intake manifolds of an engine.

Fig. 5 is an enlarged sectional view taken on line 5—5 of Fig. 4.

Fig. 6 is an enlarged section taken on line 6—6 of Fig. 1.

Fig. 7 is an enlarged section taken on line 7—7 of Fig. 1.

Fig. 8 is a view similar to Fig. 6, in illustration of the modified form of the invention.

The gasket consists essentially of ring-like metallic members which are designed to be placed around the openings for effecting the seal, and the several ring-like members of a gasket are held together in proper location by a sheet of metal suitably formed by stamping or spinning operations so as to hold the rings.

The body of the gasket or the sheet of metal is referenced 1, and this sheet may be of any desirable material, such as copper, bronze, steel, or the like, although it has been found that a steel sheet may advantageously be used. This sheet is stamped or otherwise cut out to provide suitable openings, such as 2 for the combustion chamber of engine, suitable openings 3, for the water jacket for cooling the engine where such water jacket openings are required, and openings 4 for the reception of securing bolts.

It will be understood by those skilled in the art that this gasket is disposed between the cylinder block and the cylinder head, and the head is clamped to the block by bolts extending to openings 4. The gasket shown is one of a type designed to be used in an engine of a so-called L-head type, and the openings 2 are shaped to accommodate the shape of the combustion chamber in this type of engine.

Referring now to Fig. 2, it will be noted that the sheet material is turned over, as at 5, at the edges of the opening 2. Within the space formed by this turned over part there is disposed a ring-like member of metal, which is formed of a metal which is fairly ductile. This metal may be copper, zinc, or lead, and copper wire may be advantageously used for forming this ring member. The member referred to is referenced 6. The wire is properly shaped and disposed with its ends in abutting relation, and the ends may be welded, brazed or otherwise united.

It will also be noted that the sheet material is turned back at the openings 4, as illustrated at 7, around a ring-like member 8. The ring-like member 8 is also of ductile metal, but inasmuch as the ring is rather small it is thought that it is preferable to make the ring by stamping the same out of a sheet of the metal so that the ring 8 is in the nature of a washer. Preferably it is round in cross-section, as is the ring 6, although both the ring 6 and ring 8 may have some variation of a cross-section. When the rings 8 are stamped out of sheet metal, lead may advantageously be used because the waste metal, which is stamped out of the center, can be re-melted and formed into a sheet for restamping so that practically all waste is eliminated. The water jacket opening 3 is similarly sealed by ring-like member held in place by turned over part 10 of the sheet material, as illustrated in Fig. 7.

It will be observed that the sealing ring 6 is made somewhat larger in cross-section than sealing ring 8. Also the sealing ring 9 is of the same size as sealing ring 6. This construction makes for a strong seal at the critical points. When the cylinder head is clamped down upon the block by bolts extending through apertures 4, the sealing rings 6 and 9 are flattened out somewhat and tightly clamped between the head and block. A considerable amount of flattening and clamping of the sealing rings is effected before the rings 8 are clamped. Thus the strain upon the securing bolts is reduced to a minimum. The rings 8 do not necessarily have to be clamped very tightly because no especial seal is required at these points.

In Fig. 3 there is shown a modified arrangement wherein the sheet material 11 is embossed as at 12, and the inner edge, as at 13, does not entirely overlie the ring but is merely brought up a sufficient distance beyond the center line of the ring to hold it in place. This construction is advantageous because it is not necessary to have such a great amount of flow of metal as it is in the construction shown in Fig. 2, where the metal is flanged out appreciably over the wire sealing rings. Accordingly the danger of splitting or cracking the metal is not so great. Moreover, this provides for a very effective seal, inasmuch as one of the members, that is, either the cylinder head or block, contacts directly with the exposed sealing ring.

For many engines, the gasket must be provided with reentrant curves, as illustrated at 14. For the purpose of aiding and holding the sealing wire in place at these points the sheet metal member may be stamped or otherwise provided with a teat 15, (Fig. 6) which is positioned so as to back up the wire and hold the same tightly between itself and the adjacent flanged portion of the sheet metal. The manner in which such a teat is provided in the modified form is illustrated in Fig. 8.

In Fig. 4 there is a gasket shown of a type designed for use with an intake or exhaust manifold of an internal combustion engine. In some engines the intake manifold is highly heated so as to effect a preheating of the fuel, and it is very desirable to have the gasket in such a manifold capable of withstanding the high heat at this point. The structural features of the gasket shown in Fig. 4 are the same as that in Fig. 1 in that the gasket includes a body sheet 20, sealing ring 21, and rings 22 around the bolt holes, and both rings are held by the sheet 1 in the manner as illustrated, which may be identical with that as above described in connection with Figs. 1, 2 and 3.

It will be noted that the gasket of this invention provides a large mass of metal at the critical or sealing points, and thus the gasket is capable of withstanding severe use, such as high compression and intense heat, and will not blow through under circumstance which would blow through an ordinary sheet metal gasket. Moreover, it will be noted that the gasket can be made economically largely because of the minimum of waste material. The sheet 1 is stamped out and there is some waste of course, but in the conventional gasket of today embodying two sheets of copper and interposed layer of asbestos, all of which have to be cut out, the waste is trebled. When the sealing rings are made of wire there is practically no waste material involved, and indeed there is no waste when the small sealing rings are made by being stamped out of material such as lead, because the residue can be re-melted and again used.

Claims:

1. A gasket for a cylinder head of an internal combustion engine, or the like, comprising a sheet metal body member having an opening, a wire-like metallic sealing member arranged around the edges of the opening, said sheet metal member having openings for the reception of securing bolts, a wire-like sealing member arranged around the edges of the bolt openings, the said first-named wire-like sealing member having a cross-sectional diameter greater than the wire-like members arranged around the edges of the bolt openings.

2. A gasket comprising a sheet metal member provided with suitable apertures around the edges of which a sealing effect is desired, the metal at the edges of the apertures being embossed out of the general plane of the sheet metal member to form a recess, a wire-like sealing member disposed in this recess, the extreme edge of the metal beyond the embossed portion being turned over the wire to hold the same in the recess of said sheet metal, said extreme edge however lying in a plane below that of the surface of the wire sealing member opposite the recess whereby said wire sealing member is exposed.

In testimony whereof I have affixed my signature.

CHARLES P. SHAW.